United States Patent [19]

Rodaway

[11] 4,330,634

[45] May 18, 1982

[54] FOAM COMPOSITES

[75] Inventor: Bruce K. Rodaway, Birmingham, England

[73] Assignee: Dunlop Limited, London, England

[21] Appl. No.: 209,679

[22] Filed: Nov. 24, 1980

[30] Foreign Application Priority Data

Dec. 7, 1979 [GB] United Kingdom ............... 7942389

[51] Int. Cl.$^3$ ............................................. C08J 9/30
[52] U.S. Cl. .................................... 521/65; 521/54; 521/91; 521/134; 521/141; 521/149; 523/218; 523/219
[58] Field of Search .................. 260/42.43, 42.51; 521/91, 134, 141, 149, 65

[56] References Cited

U.S. PATENT DOCUMENTS

| | | | |
|---|---|---|---|
| 3,775,351 | 11/1973 | Sachs | 521/65 |
| 3,965,051 | 6/1976 | Marbusch et al. | 521/100 |
| 4,137,198 | 1/1979 | Sachs | 521/154 |

FOREIGN PATENT DOCUMENTS

| | | |
|---|---|---|
| 2537803 | 3/1977 | Fed. Rep. of Germany . |
| 983518 | 2/1965 | United Kingdom . |
| 1122403 | 8/1968 | United Kingdom . |
| 1138473 | 1/1969 | United Kingdom . |
| 1139430 | 1/1969 | United Kingdom . |
| 1301175 | 4/1969 | United Kingdom . |
| 1316129 | 5/1973 | United Kingdom . |
| 1422337 | 1/1976 | United Kingdom . |
| 1448042 | 9/1976 | United Kingdom . |
| 1484454 | 9/1977 | United Kingdom . |
| 1532954 | 11/1978 | United Kingdom . |
| 1548419 | 7/1979 | United Kingdom . |
| 1548420 | 7/1979 | United Kingdom . |

*Primary Examiner*—Morton Foelak
*Attorney, Agent, or Firm*—Stevens, Davis, Miller & Mosher

[57] ABSTRACT

The invention relates to the production of foam composites which are thermally insulating and light and therefore suitable for use as e.g. ceiling tiles, wall tiles and brick insulation.

The aim of the invention is to produce a light, strong composite as cheaply as possible. The method comprises reacting, in the presence of water and poly(vinyl alcohol), hollow silica spheres with a water-soluble organic polyacid and then allowing or causing the resulting composite to set.

14 Claims, No Drawings

FOAM COMPOSITES

This invention relates to novel composites, to methods of making them and to uses of said composites.

According to one aspect of the present invention, a composite comprises hollow silica spheres in an organic polyacid foam matrix containing poly(vinyl alcohol).

According to a further aspect of the present invention, a method of making a composite of hollow silica spheres in an organic polyacid foam matrix comprises reacting in the presence of water and poly(vinyl alcohol), hollow silica spheres with a water-soluble organic polyacid and then allowing or causing the resulting composite to set.

The hollow silica spheres usually have a specific gravity of less than 1, a size range from 0.02 cm to 0.002 cm, include from 40 to 70% by weight silica (as $SiO_2$) and are substantially non-porous. These spheres are often referred to as "microspheres". Of the ingredient or ingredients other than silica, at least one must be capable of forming at least one type of ion which is either leachable from the spheres by the action of aqueous polyacid or which remains upon the surface of the spheres. Examples of these further ingredients include alumina, calcium oxide, magnesium oxide, zinc oxide, an iron oxide, an alkali metal oxide, titanium oxide, manganese oxide and/or another trace-metal oxide. So-called "fly ash", the material deposited by cool-burning furnaces, includes hollow silica spheres which can be separated from the remainder e.g. by a flotation technique and these hollow silica spheres are particularly suitable for use in the present invention. This fraction consisting substantially of hollow silica spheres is available commercially e.g. as "Fillite" which has the following composition:

| | |
|---|---|
| Silica | 55 to 61% |
| Alumina (as $Al_2O_3$) | 26 to 30% |
| Alkalis (as $Na_2O$, $K_2O$) | 0.5 to 4% |
| Iron Oxides (as $Fe_2O_3$) | up to 4% |

The size range of "Fillite" is from 5 to 300 microns in diameter and the specific gravity is from 0.35 to 0.7. Another commercially available material consisting of hollow silica spheres is "Pozament" supplied by Pozament Cement Limited and having the following composition:

| | |
|---|---|
| Silica (as $SiO_2$) | 60% |
| Alumina (as $Al_2O$) | 27% |
| Iron (as $Fe_2O_3$) | 4% |
| Calcium (as CaO) | 0.2% |
| Magnesium (as MgO) | 2% |
| Alkalis (as $K_2O$) | 4% |
| (as $Na_2O$) | 1% |
| Loss on ignition (carbon) | 0.5% |
| Water solubles | 1.3% |

The size range of "Pozament" is from 10 to 200 microns in diameter and the specific gravity is from 0.4 to 0.6. (Mean diameter is about 100 microns with approximately 5% below 50 microns and 25% above 125 microns). Other commercially available silica spheres are "Microballoons", "Armospheres" and "Microstell".

Usually the proportion by weight of hollow silica spheres based on the total weight of the final, set composite is in the range 80% to 97.5% and preferably 90% to 95%. Preferably the amount of poly (vinyl alcohol) is in the range up to 1:1 based on the weight of polyacid. Poly (vinyl acetate) may be incorporated in the reaction mixture (e.g. in an amount of up to b 1:1 based on the weight of polyacid) and thus additional ingredient may have the effect of stabilising the mixture, thereby improving the physical properties, such as compression strength and impact resistance, of the final product.

Preferably the organic polyacid is a polymer of an organic carboxylic acid and more preferably it is a polymer prepared by the homopolymerisation or copolymerisation of an unsaturated aliphatic carboxylic acid (e.g. acrylic acid, substituted acrylic acid, methacrylic acid, itaconic acid, maleic acid or fumaric acid) with or without another unsaturated aliphatic monomer e.g. acrylamide, styrene, vinyl acetate or acrylonitrile. A particularly preferred polyacid is a homopolymer or copolymer of acrylic acid. An alternative polyacid is a homopolymer or copolymer of a sulphonic acid. If desired a precursor of an organic polyacid may be used in the reaction mixture which will be transformed into the required polyacid in contact with water e.g. a polymer of a carboxylic acid anhydride or a polymer modified with an anhydride such as an adduct of maleic anhydride and polybutadiene. The poly (carboxylic acid anhydride) may be a homopolymer or a copolymer with e.g. a vinyl monomer such as a vinyl hydrocarbon monomer e.g. methyl vinyl ether. Particularly suitable polymers include homopolymers and copolymers of maleic anhydride with at least one monomer selected from ethylene, propene, butene and styrene.

The polyacid or precursor thereof is preferably linear and preferably has an average molecular weight of from 3,500 to $20 \times 10^6$ and more preferably from 76,000 to $13.2 \times 10^6$. In this specification, the average molecular weight would be that measured by an absolute method such as light scattering or ultracentrifuge sedimentation. The polyacid may be incorporated into the reaction mixture as an aqueous solution or it may be dry-mixed with the silica speres before water is added. Whatever method is used, the amount of polyacid by weight is preferably in the range 2 to 20% based upon the total weight of water in the reaction mixture. It is thought that the polyacid is cross-linked by ions leached from the surfaces of the spheres and/or by ions remaining upon the surface of the spheres but the invention is not intended to be limited by this theory.

The foam produced according to the present invention is a result of chemical reaction and/or mechanical agitation and the final void content is usually from 90% to 99% by volume. Any mechanical agitation is usually carried out on an aqueous solution of the polyacid and poly (vinyl alcohol) prior to the addition of hollow silica spheres. A blowing agent and/or surfactant (e.g. poly (vinyl alcohol) sodium formaldehyde naphthalene sulphonate available as Daxad 11, lauryl pyridinium chloride or a hydrolysed protein extract available as Nicerol) and/or a sequestrant may be incorporated in the reaction mixture, suitably each being in the proportion 0 to 10% by weight based upon the total polymer content. A water-soluble chelating agent e.g. tartaric acid, citric acid, ethylene diamine tetra-acetic acid may accelerate the setting time of the reaction mixture and preferably is used in an amount from 0 to 20% by weight based upon the total polymer content. Additional ingredients such as a surfactant or chelating agent are conveniently incorporated into the reaction mixture as aqueous solutions. A filler, e.g. a fibrous material such as fibreglass or rockwool, may be incorporated into the reaction mixture in an amount such that the proportion by weight based upon the final weight of the set foam composite is from 0% to 50%.

The reaction mixtures may be used to coat a substrate or to cement substrates together, e.g. glass, and thus according to yet another aspect of the present invention a method of coating a substrate comprises contacting it with a cement of hollow silica spheres in an aqueous solution of an organic polyacid and then allowing or causing the cement to set. The foam composites may be set by the application of heat e.g. in an oven or may be left to dry at a room temperature. Composites produced in accordance with this invention may be light, fire resistant, thermally insulating and load bearing. The ingredients selected and the proportions and way in which they are used may be determined by the intended end use of the final product. For example if a very light product is desired the polyacid could be used in a relatively low concentration and foamed mechanically before the silica spheres are added.

The invention is illustrated in the following Examples I to VII, Example VIII being included for comparison only.

EXAMPLE I

The following formulation was mechanically foamed by means of an air driven strirrer to a volume of 600 ml.

| | |
|---|---|
| 25% aqueous solution poly(acrylic acid) | 40 g |
| 5% aqueous solution poly(vinyl alcohol) 85% hydrolysed | 100 g |
| DAXAD 11 (sodium formaldehyde naphthalene sulphonate) | 1 g |
| Water | 20 g |

10 ml of a 10% aqueous solution of tartaric acid were added to this foam.

The foam was then mixed gently with 100 g Fillite 200/5 (which has a mesh size of 200≡75 microns and an s.g. of 0.5) by folding the ingredients together. The resulting expanded composite was put into an aluminium frame, 15 cm long×15 cm wide×1 cm high supported on glass fibre fabric. After 15 minutes the composite had set sufficiently to allow removal of the frame and was then dried in a circulating air oven at 50° C. The fabric could then be peeled away to leave a strong tile of density 0.27 g/cc having good thermal insulation properties. Such a tile could be used as a ceiling tile.

EXAMPLE II

The Example I formulation was prepared and the resulting solution mixed into about 150 g Fillite SG (which is Standard Grade fly ash believed to correspond to Grade 52/7/s i.e. 52 mesh and an s.g.=0.7) to give a workable paste. 10 ml of a 10% aqueous solution of tartaric acid were then added to this paste. The paste was then applied to an ordinary house brick as a 1 cm layer and then smoothed flat. The paste was allowed to set to give a tough, insulating coating which showed good adhesion to the brick.

EXAMPLE III

A foam was prepared according to the method outlined in Example I using the following formulation:

| | |
|---|---|
| 25% aqueous solution poly(acrylic acid) M wt. 230,000 | 40 g |
| 5% aqueous solution poly(vinyl alcohol) 85% hydrolysed | 100 g |
| 50% poly(vinyl acetate) latex | 20 g |
| DAXAD 11 | 1 g |
| Water | 20 g |

10 ml of a 10% aqueous solution of tartaric acid was added to the resulting foam. The foam was then gently mixed with 150 g Fillite 200/5. The expanded composite was put into an aluminium frame, 15 cm×15 cm×1 cm, supported on glass fibre fabric and dried. A strong tile of density 0.27 g/cc resulted and was found to have enhanced physical properties (compression strength and impact resistance) compared with a tile based upon poly(acrylic acid)/poly(vinyl alcohol), showing the influence of poly(vinyl acetate) in this formulation.

EXAMPLE IV

A foam was prepared according to the method outlined in Example I using the following formulation:

| | |
|---|---|
| 25% aqueous solution poly(acrylic acid) m. wt. 230,000 | 80 g |
| 5% aqueous solution poly(vinyl alcohol) 85% hydrolysed | 200 g |
| DAXAD 11 | 2 g |
| Water | 40 g |

20 ml of an aqueous 10% trichloroacetic acid solution was added to the above foam. The foam was gently mixed with Pozament fly ash (450 g). This mixture was cast in the form of a ceiling tile 30 cm×30 cm×2.5 cm and dried at 70° C. in an air oven. The sample after drying and further heat treatment at 120° C. had improved water resistance compared with that of Example I.

EXAMPLE V

A foam was prepared according to the formulations outlined in Example I except that the poly(acrylic acid) was of higher molecular weight ($2.6 \times 10^6$) and contained 10 ml $H_2O_2$ (as 100 volumes; 27.5 wt. % in water).

Fly ash (150 g), previously mixed with 0.15 g $MnO_2$ was added and chemical blowing gave a foam of 0.20 g/cc density.

This formulation could be used for spraying directly from a spray gun, the mixing and foaming taking place on the substrate.

EXAMPLE VI

To 200 ml 5% poly(vinyl alcohol), 50 ml water and 2 g Daxad 11 were added 10 g Santrex AN.169 (a maleic anhydride/methyl vinyl ether copolymer). This copolymer was hydrolysed in situ by raising the temperature to 90° C. with stirring. The mixture was foamed to 7 fold expansion and 450 g Pozament fly ash and 2 g tartaric acid (20 ml of a 20% aqueous solution) were gently blended into it. The resulting mixture was poured into a mould, allowed to gel and dried at 70° C. A product of density 0.13 g/cc was produced suitable for interior use, especially where there is risk of condensation or water splashing.

EXAMPLE VII

Many of the above products could be surface impregnated with epoxy or polyester resin to give extremely hard and rigid products of comparable physical strength to those of more conventional syntactic foams prepared by the direct mixing of micropspheres with resin. (The impregnated surface is in fact a syntactic resin/glass sphere foam surface.)

EXAMPLE VIII

The following formulation was prepared and attempts were made, unsuccessfully, to foam the composition.

| | |
|---|---|
| 5% aqueous solution poly(acrylic acid) | 200 g |
| Latamol (surfactant - sodium naphthalene formaldehyde sulphonate) | 1 g |
| 10% tartaric acid | 10 g |

Hollow silica spheres were added to the composition and a plaster-like cement composition resulted which was found to be weaker than that produced according to Example II and had a longer setting time.

Having now described my invention—what I claim is:

1. A composite comprising hollow silica spheres having a silica content from 40 to 70% by weight and a size range of 0.03 to 0.0005 CM. in an organic polyacid foam matrix containing poly(vinyl alcohol), wherein said organic polyacid is a polymer of an organic carboxylic acid.

2. A composite according to claim 1, wherein the proportion by weight of hollow silica spheres is in the range 80% to 97.5% based on the total weight of the composite.

3. A composite according to claim 1, wherein the proportion by weight of hollow silica spheres is in the range 90% to 95% based on the total weight of the composite.

4. A composite according to claim 1, 2 or 3, wherein the polyacid has an average molecular weight of from 3,500 to $20 \times 10^6$.

5. A composite according to claim 1, 2 or 3, wherein the polyacid has an average molecular weight of from 76,000 to $13.2 \times 10^6$.

6. A composite according to claim 1, 2 or 3, wherein the polyacid is a polymer of acrylic acid.

7. A composite according to claim 1, 2 or 3, wherein the void content of the composite is from 90% to 99% by volume.

8. A composite according to claim 1, 2 or 3, wherein the polyacid foam matrix also contains poly(vinyl acetate).

9. A method of making a composite comprising hollow silica spheres having a silica content from 40 to 70% by weight and a size range of 0.03 to 0.0005 CM. in an organic polyacid foam matrix comprising reacting, in the presence of water and poly(vinyl alcohol), hollow silica spheres with a water-soluble organic polyacid and then allowing or causing the resulting composite to set wherein said organic polyacid is a polymer of an organic carboxylic acid.

10. A method according to claim 9, wherein mechanical agitation is applied to an aqueous solution of the polyacid containing poly(vinyl alcohol) prior to the addition of the hollow silica spheres.

11. A method according to claim 9 or 10, wherein a blowing agent is included in the reaction mixture.

12. A method according to claim 9 or 10, wherein a chelating agent is included in the reaction mixture.

13. A method according to claim 9 or 10, wherein the polyacid is incorporated in the reaction mixture as a precursor which will be transformed into the required polyacid in contact with water.

14. A method according to claim 10 having the features defined in any one of claims 1 to 3.

* * * * *

UNITED STATES PATENT AND TRADEMARK OFFICE
CERTIFICATE OF CORRECTION

PATENT NO. : 4,330,634
DATED     : May 18, 1982
INVENTOR(S) : Bruce K. Rodaway

It is certified that error appears in the above-identified patent and that said Letters Patent is hereby corrected as shown below:

Column 2, line 3, delete "b".

Column 5, line 7, "micropspheres" should read
-- microspheres --.

Signed and Sealed this

Twelfth Day of October 1982

[SEAL]

Attest:

GERALD J. MOSSINGHOFF

Attesting Officer    Commissioner of Patents and Trademarks